United States Patent
Park et al.

(10) Patent No.: US 9,576,489 B2
(45) Date of Patent: Feb. 21, 2017

(54) APPARATUS AND METHOD FOR PROVIDING SAFE DRIVING INFORMATION

(71) Applicant: ETRI-JIM-ELECTRONICS AND TELECOMMUNICATIONS RESEARCH INSTITUTE, Daejeon (KR)

(72) Inventors: Hye Sun Park, Daejeon (KR); Chang Rak Yoon, Daejeon (KR); Kyong Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/598,733

(22) Filed: Jan. 16, 2015

(65) Prior Publication Data

US 2015/0206431 A1 Jul. 23, 2015

(30) Foreign Application Priority Data

Jan. 23, 2014 (KR) .......................... 10-2014-0008253

(51) Int. Cl.
G08G 1/0962 (2006.01)
B60K 28/00 (2006.01)

(52) U.S. Cl.
CPC ............ *G08G 1/0962* (2013.01); *B60K 28/00* (2013.01)

(58) Field of Classification Search
CPC ............................... B60K 28/00; G08G 1/0962
USPC ............................................................. 701/1
See application file for complete search history.

(56) References Cited

U.S. PATENT DOCUMENTS

| 7,313,467 | B2* | 12/2007 | Breed | G07C 5/008 307/9.1 |
| 7,792,328 | B2* | 9/2010 | Albertson | B60W 40/09 340/576 |
| 8,135,507 | B2* | 3/2012 | Okabe | A61B 5/165 180/272 |
| 2007/0027583 | A1* | 2/2007 | Tamir | G06Q 30/0283 701/1 |
| 2007/0057781 | A1* | 3/2007 | Breed | B60K 35/00 340/457.1 |
| 2007/0280505 | A1* | 12/2007 | Breed | B60W 40/08 382/104 |

(Continued)

FOREIGN PATENT DOCUMENTS

WO WO-2011/070783 A1 6/2011

*Primary Examiner* — Atul Trivedi
(74) *Attorney, Agent, or Firm* — Rabin & Berdo, P.C.

(57) ABSTRACT

Provided are an apparatus and method for providing safe driving information. The method includes building a database including group information obtained by grouping driving environment information and driving situation information according to attributes of the driving environment information and the driving situation information, and provision forms and provision timings of safe driving information determined according to conditions in groups; collecting driving environment information, driving situation information, obstacle information, and information on a driver's line of sight in real time; determining a provision form and a provision timing of safe driving information based on the collected information and the database; and providing the safe driving information according to the determined provision form and timing.

13 Claims, 4 Drawing Sheets

(56) References Cited

U.S. PATENT DOCUMENTS

| | | | | |
|---|---|---|---|---|
| 2008/0119994 | A1* | 5/2008 | Kameyama | B60W 40/08 701/48 |
| 2009/0234552 | A1* | 9/2009 | Takeda | B60W 30/16 701/96 |
| 2010/0253526 | A1* | 10/2010 | Szczerba | B60K 28/066 340/576 |
| 2011/0106334 | A1* | 5/2011 | Filev | B60Q 1/50 701/1 |
| 2012/0109406 | A1* | 5/2012 | Yousefi | H04N 7/183 701/1 |
| 2012/0154441 | A1 | 6/2012 | Kim | |
| 2012/0235805 | A1 | 9/2012 | Nogami et al. | |
| 2012/0271484 | A1* | 10/2012 | Feit | B60W 50/14 701/1 |
| 2013/0141250 | A1 | 6/2013 | Mathieu et al. | |
| 2013/0144461 | A1* | 6/2013 | Ricci | G06F 9/54 701/1 |
| 2013/0332004 | A1* | 12/2013 | Gompert | G07C 5/008 701/1 |
| 2014/0236414 | A1* | 8/2014 | Droz | B60W 30/00 701/28 |
| 2014/0303807 | A1* | 10/2014 | Addepalli | H04W 4/046 701/1 |
| 2014/0309885 | A1* | 10/2014 | Ricci | H04W 48/04 701/41 |
| 2015/0166072 | A1* | 6/2015 | Powers | B60W 40/06 701/1 |
| 2015/0235485 | A1* | 8/2015 | Nemat-Nasser | G07C 5/08 701/1 |
| 2015/0266471 | A1* | 9/2015 | Ferguson | G08G 1/09623 701/23 |
| 2015/0266472 | A1* | 9/2015 | Ferguson | G01C 21/3461 701/23 |
| 2015/0276415 | A1* | 10/2015 | Shrinath | G01C 21/36 701/1 |

\* cited by examiner

APPARATUS AND METHOD FOR PROVIDING SAFE DRIVING INFORMATION

CROSS-REFERENCE TO RELATED APPLICATION

This application claims priority to and the benefit of Korean Patent Application No. 10-2014-0008253, filed on Jan. 23, 2014, the disclosure of which is incorporated herein by reference in its entirety.

BACKGROUND

1. Field of the Invention

The present invention relates to an apparatus and method for providing safe driving information, and more particularly, to an apparatus and method for providing safe driving information using a head-up display (HUD) of a vehicle.

2. Discussion of Related Art

With the development of vehicle electronic systems, an HUD technology for additionally displaying vehicle information on the windshield of a vehicle has emerged lately. At home and abroad, development is underway of a HUD system that enables a vehicle driver to be provided with information while looking ahead.

An existing HUD system only displays simple information, such as a vehicle speed, on the windshield of a vehicle. However, during an actual travel, it is most important to provide a driver with warning information of collision accidents among many pieces of information provided for safe driving. Here, an HUD system should provide information on an obstacle in front of a vehicle according to the driver's line of sight such that the driver's load of recognition can be reduced. The reduction in the load of recognition facilitates the driver's understanding of the information on the obstacle in front of the vehicle.

For this reason, an augmented reality HUD (AR-HUD) system that provides information according to a driver's line of sight is recently under vigorous development. Information provided by such an AR-HUD system should be displayed according to a driver's line of sight while the driver looks ahead. In addition, it is important to lead to safe driving while minimizing a driver's load of driving such as the load of recognition.

In particular, there is a need for a technology for providing communication information in a form that can be easily recognized by a driver and adjusting provision-related times (e.g., a provision time point, a provision interval, and a provision duration) according to an actual driving environment or situation.

SUMMARY OF THE INVENTION

The present invention is directed to providing an apparatus and method for providing information on an obstacle in front of a vehicle in a form that can be easily recognized by the driver of the vehicle, and adjusting provision-related times (e.g., a provision time point, a provision interval, and a provision duration of safe driving information) according to an actual driving environment or situation when an augmented reality head-up display (AR-HUD) system provides an anti-collision warning or caution information in front of a driver according to the driver's field of vision.

According to an aspect of the present invention, there is provided an apparatus for providing safe driving information, the apparatus including: an information collecting module configured to collect driving environment information and driving situation information of a vehicle, obstacle information, and information on a driver's line of sight from sensors, and process the collected information; a database unit configured to store provision forms and provision timings of previously set safe driving information according to groups formed by grouping driving environment information and driving situation information by attribute and driving environment conditions and driving situation conditions in the groups; a determination module configured to determine a provision form and a provision timing of safe driving information during a travel based on the driving environment information, the driving situation information, the obstacle information, and the information on the driver's line of sight obtained from the information collecting module and the provision forms and the provision timings stored in the database unit; and an information providing module configured to control a display unit to provide the safe driving information according to the determined provision form and provision timing of the safe driving information.

The information collecting module may collect the driving environment information and the driving situation information of the vehicle, the obstacle information, and the information on the driver's line of sight from an environment recognition device including at least one of a temperature sensor, a rain sensor, and an illumination sensor, a surrounding situation recognition device including at least one of a speed sensor, a steering angle sensor, a brake pressure sensor, a diagnosis sensor, and a navigation sensor, an obstacle recognition device including at least one of a radar, an infrared sensor, an ultrasonic sensor, and a vision sensor, and a device for recognizing a driver's line of sight including at least one of an eye tracker and a vision sensor.

The database unit may store the driving environment information, group information obtained by grouping the driving environment information according to the attributes of the driving environment information, and provision forms and provision timings of safe driving information according to the conditions in the group information.

The database unit may store provision forms and provision timings of safe driving information determined through a test according to the conditions in the group information based on analysis results of recognition easiness, information understanding, information concentration, and safe driving performance of the driver.

The determination module may determine the provision form and the provision timing of the safe driving information through at least one of a simple comparison and evaluation of provision forms and provision timings between comparison groups, a simple comparison and evaluation of safety weights between comparison groups, and a detailed comparison and evaluation of safety weights between comparison groups based on the driving environment information, the driving situation information, and the provision forms and the provision timings stored in the database unit according to the conditions in the groups.

When provision forms and provision timings according to conditions of groups are identical, the determination module may determine the identical provision form and timing as the provision form and the provision timing of the safe driving information.

When provision forms and provision timings according to conditions of groups are different, the determination module may determine the provision form and the provision timing of the safe driving information according to a result of the simple comparison and evaluation of safety weights between comparison groups.

When the result of the simple comparison and evaluation of safety weights between comparison groups indicates that weights for the conditions of the groups are identical, the determination module may determine an enhanced provision form and provision timing of the safe driving information by combining provision forms and provision timings for the conditions of the evaluation-target groups through the detailed comparison and evaluation of safety weights between comparison groups.

According to another aspect of the present invention, there is provided a method of providing safe driving information, the method including: building a database including group information obtained by grouping driving environment information and driving situation information according to attributes of the driving environment information and the driving situation information, and provision forms and provision timings of safe driving information determined according to conditions in groups; collecting driving environment information, driving situation information, obstacle information, and information on a driver's line of sight in real time; determining a provision form and a provision timing of safe driving information based on the collected information and the database; and providing the safe driving information according to the determined provision form and timing.

The building of the database may include: setting criteria for grouping the driving environment information, the driving situation information and the obstacle information; setting tasks to be performed in tests; setting test environments for determining group-specific optimal provision forms and timings; conducting the tests; analyzing test results; and determining the provision forms and the provision timings according to the conditions in the groups based on analysis results, and storing the provision forms and the provision timings according to the conditions in the groups as the database.

The determining of the provision forms and the provision timings according to the conditions in the groups may include determining the provision forms and the provision timings of safe driving information through the tests according to the conditions in the groups based on analysis results of recognition easiness, information understanding, information concentration, and safe driving performance of the driver.

The determining of the provision form and the provision timing of the safe driving information may include: comparing initial values of group-specific provision forms and provision timings based on at least one of the driving environment information and the driving situation information and the provision forms and the provision timings of safe driving information stored in the database; and determining the initial values as the provision form and the provision timing of the safe driving information when the compared initial values are identical.

The determining of the provision form and the provision timing of the safe driving information may further include, when the compared initial values are different, determining group-specific safety weights, and determining initial values of a group having a higher safety weight according to a determination result as the provision form and the provision timing of the safe driving information.

The determining of the provision form and the provision timing of the safe driving information may further include, when the determined group-specific safety weights are identical, determining the provision form and the provision timing of the safe driving information through weight enhancement between comparison groups.

The providing of the safe driving information may include matching an AR-HUD in a vehicle to the driver's line of sight based on the information on the driver's line of sight, and providing the safe driving information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will now be described more fully with reference to the accompanying drawings to clarify aspects, features, and advantages of the present invention. The invention may, however, be embodied in many different forms and should not be construed as being limited to the embodiments set forth herein. Rather, these embodiments are provided so that this disclosure will be through and complete, and will fully convey the concept of the invention to those of ordinary skill in the art. The present invention is defined by the appended claims. Meanwhile, the terms used herein are for the purpose of describing particular exemplary embodiments only and are not intended to be limiting. As used herein, the singular forms "a," "an," and "the" are intended to include the plural forms as well, unless the context clearly indicates otherwise. It will be further understood that the terms "comprises" or "comprising," when used in this specification, do not preclude the presence or addition of one or more components, steps, operations, and/or elements other than a mentioned component, step, operation, and/or element.

Hereinafter, exemplary embodiments of the present invention will be described in detail with reference to the accompanying drawings. Throughout the drawings, like numbers refer to like elements. Further, when it is determined that a detailed description of a known configuration or function related to the present invention may obscure the gist of the present invention, the detailed description will be omitted.

It is to be understood that the term "module" used herein can include software, hardware, or a combination thereof in accordance with the context in which term is used. For example, the software can be machine code, firmware, embedded code, and application software. Also, for example, the hardware can be circuitry, a processor, a computer, an integrated circuit (IC), an IC core, a sensor, a microelectromechanical system (MEMS), a passive device, or a combination thereof.

Exemplary embodiments of the present invention will now be described in detail below with reference to the accompanying drawings.

Figure 1:
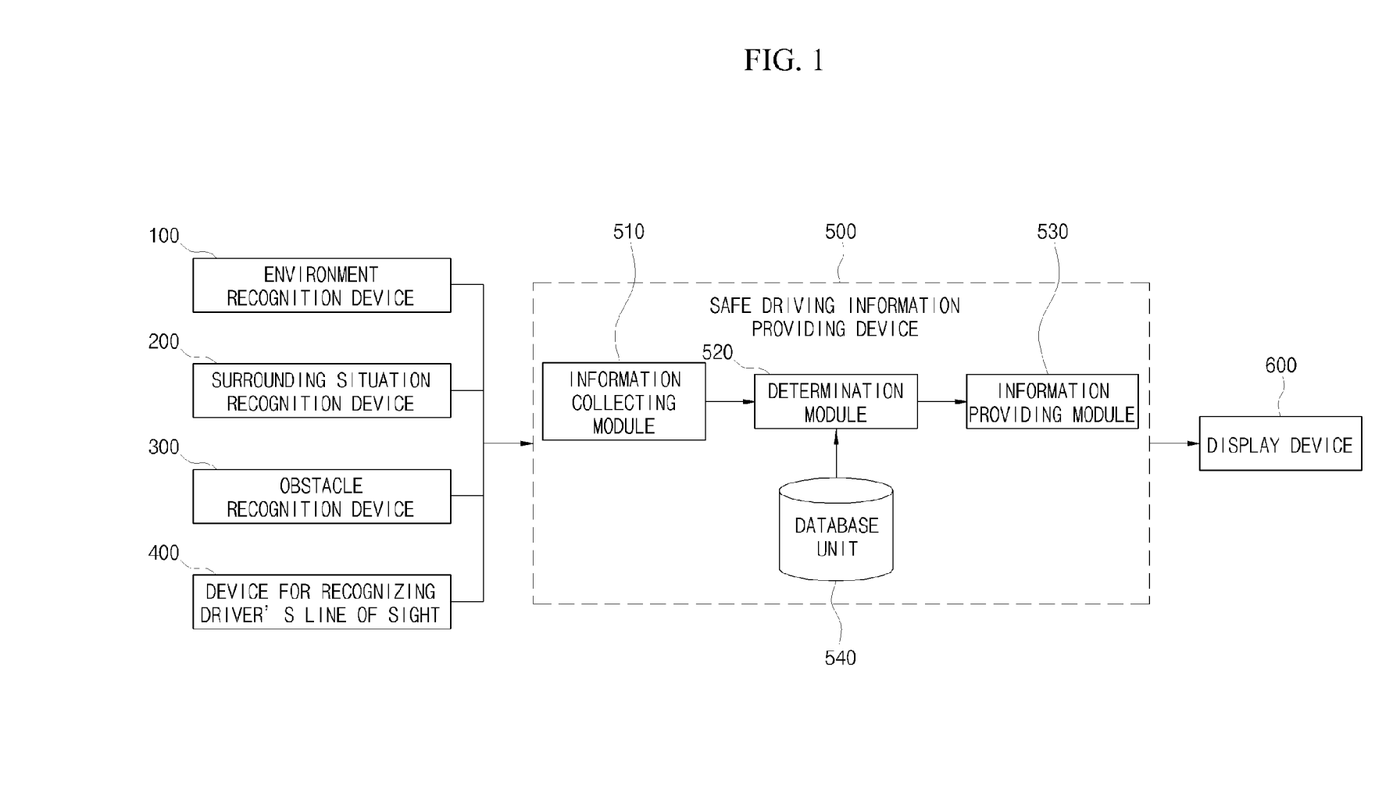
FIG. 1 is a block diagram of an overall system for providing safe driving information according to an exemplary embodiment of the present invention.

FIG. 1 is a block diagram of an overall system for providing safe driving information according to an exemplary embodiment of the present invention.

As shown in FIG. 1, a system for providing safe driving information according to an exemplary embodiment of the present invention includes an environment recognition device 100, a surrounding situation recognition device 200, an obstacle recognition device 300, a device 400 for recognizing a driver's line of sight, a safe driving information providing device 500, and a display device 600.

The environment recognition device 100 includes environmental sensors, such as a temperature sensor, a rain sensor, and an illumination sensor, and obtains driving environment information including weather information, illumination information, etc. using these sensors.

The surrounding situation recognition device 200 obtains driving situation information through a navigation system, an on board diagnosis (OBD) sensor, and so on.

Here, the driving situation information may include internal situation information of a vehicle, that is, speed information, steering angle information, a brake pressure value, external situation information of the vehicle, that is, road attribute information, such as the number of lanes of a driving road and a road type (e.g., highway or general road), and so on.

The obstacle recognition device 300 recognizes an obstacle ahead in all driving situations including daytime, nighttime, and bad weather, and includes a radar, a far infrared (FIR)/near infrared (NIR) sensor, a vision sensor, and so on. The obstacle recognition device 300 senses whether or not there is an obstacle in front of the vehicle, detecting an obstacle including a vehicle and a pedestrian in front of the vehicle.

The device 400 for recognizing a driver's line of sight obtains a driver's line of sight or angle of vision from an eye tracker, a vision sensor, etc., and extracts the position information of the driver's line of sight or tracks the driver's line of sight.

The safe driving information providing device 500 includes an information collecting module 510, a determination module 520, an information providing module 530, and a database unit 540.

The information collecting module 510 collects driving environment information, driving situation information, obstacle information, and information on the driver's line of sight from the aforementioned input devices, and processes the collected information. For example, the information collecting module 510 collects weather information (e.g., clear or cloudy), driving time information (e.g., daytime or nighttime), etc. from the environment recognition device 100, and processes the collected information.

Also, the information collecting module 510 collects the internal or external situation information of the vehicle from the surrounding situation recognition device 200, and processes the collected information. Here, the internal situation information of the vehicle can include vehicle driving information, such as the speed and the steering angle of the vehicle, whether or not a brake operates, and a brake pressure value, and the external situation information of the vehicle can include road attribute information, such as classification information between a highway and a general road, and the number of lanes of a driving road.

In addition, the information collecting module 510 collects obstacle information including the type of an obstacle (classification of a vehicle, a pedestrian, etc.), the position of the obstacle, the number of obstacles, etc. from the obstacle recognition device 300, and processes the collected information.

Furthermore, to provide information according to the driver's line of sight, the information collecting module 510 collects information, such as parameter information required for camera calibration, and coordinate values of the three dimensional (3D) position of the driver's line of sight from the device 400 for recognizing a driver's line of sight, and processes the collected information.

The determination module 520 determines the provision form and the provision timing of safe driving information. Detailed operation of the determination module 520 will be described layer.

The information providing module 530 performs an operation necessary to appropriately provide safe driving information according to the provision form and the provision timing determined by the determination module 520 to the display device 600. For example, the information providing module 530 processes the format and the color of safe driving information, the thickness of a line, and a letter size to be recognizable by the driver, and determines a provision position on the display device 600, such as an augmented reality head-up display (AR-HUD) that can match the driver's line of sight obtained from the device 400 for recognizing a driver's line of sight. Here, safe driving information denotes a warning message and an alarm for safe driving. For example, safe driving information is an alarm or a message, such as "reduce the speed," or "turn on the headlights," provided to the driver for safe driving according to a driving situation and a driving environment.

The database unit 540 stores previously processed data of provision forms and provision timings of safe driving information.

Figure 2:
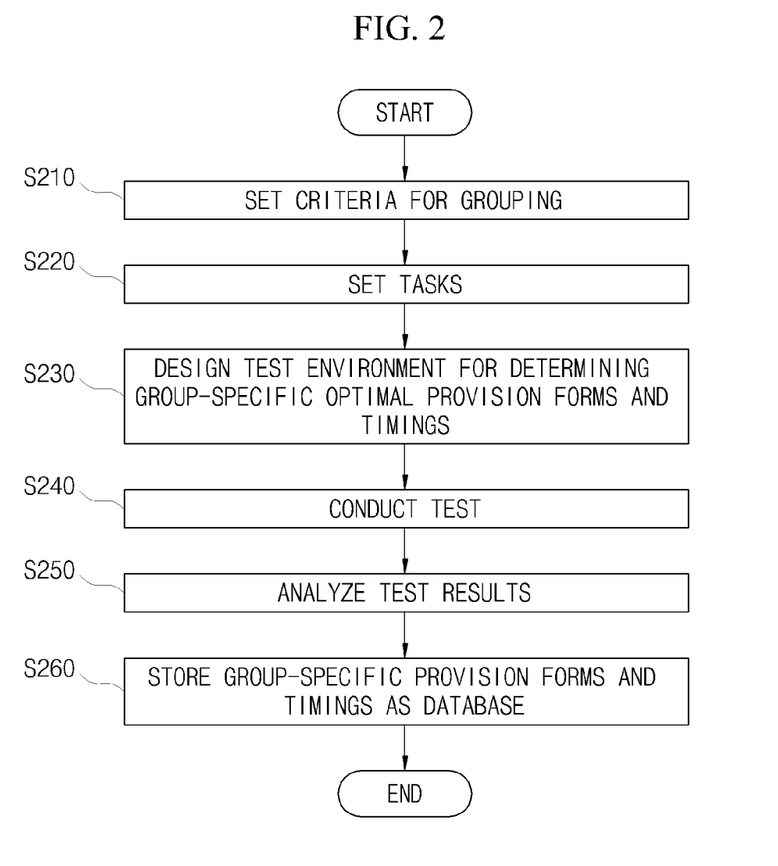
FIG. 2 is a flowchart of a database building process according to an exemplary embodiment of the present invention.

With reference to FIG. 2, a process of building a database according to an exemplary embodiment of the present invention will be described below.

A database according to an exemplary embodiment of the present invention is built through a process of analyzing a driving situation in real time based on standard provision forms and provision timings (provision time, period, etc.) of safe driving information defined by Japan Automobile Manufacturers (JAMA), International Organization for Standardization (ISO), national Highway Traffic Safety Administration (NHTSA), University of Michigan Transportation Research Institute (UMTRI), etc., and generating provision forms and provision timings of safe driving information.

Through a test or using a vehicle simulator, provision forms and timings appropriate for various conditions that may occur during a travel are extracted from the generated provision forms and timings.

In other words, various conditions that may occur during a travel are classified according to environments, driving situations, the types and the positions of obstacles present in front of a vehicle, etc. and grouped by attribute. Subsequently, group-specific optimal provision forms and timings are determined based on analysis results of recognition easiness, information understanding, information concentration, safe driving performance, etc. of the driver according to group-specific provision forms and timings. For example, safe driving information is provided to the driver according to various basic provision forms and timings defined in ISO, JAMA, etc., and then an information providing method in which the driver is provided with the information and most rapidly reacts to the corresponding situation is determined as an information providing method that can be most easily recognized for the corresponding group.

A process of extracting safe driving information provision forms and provision timings based on a vehicle simulator will be described in detail below.

First, driving environment information, driving situation information, obstacle information, a driver's line of sight information, etc. are grouped according to attributes thereof (S210).

Specifically, various conditions that may occur during a travel can be classified as driving environments, such as the weather and illumination, driving situations, such as a vehicle speed and the distance from an obstacle ahead, the type and the position of a detected obstacle, and so on. Here, the type of an obstacle (a vehicle, a pedestrian, or others) and the position of an obstacle (a road, an intersection, a sidewalk, etc.) belong to an obstacle group, and information, such as a driving speed, a change in steering angle, and a brake pressure value, belong to a vehicle state information group.

Subsequently, driver-performing operations, such as putting of the brake and operating of a wiper, are set as tasks (S220), and a test environment is set to determine group-specific optimal provision forms and provision timings (S230).

According to the set environment, a test or a simulation is conducted (S240). In the test, recognition easiness, information understanding, information concentration, a satisfaction level, and safe driving performance, etc. of the driver are analyzed according to group-specific provision forms and timings.

For the analysis, it is possible to use information on the driver's line of sight, such as the degree of dispersion of the driver's angle of vision, and the frequency of an angle of vision, physical information of the vehicle, such as the brake and a steering angle after provision of information, and so on.

Subsequently, by analyzing simulation results obtained based on the information on the driver's line of sight and the physical information of the vehicle, group-specific (specifically, in accordance with conditions in each group) optimal provision forms and provision timings of safe driving information are determined (S250).

For example, when physical information of the vehicle, such as a change of vehicle control information, is analyzed, the values of a time point at which the brake is put on, a brake pressure, and a probability of collision can be extracted from an autonomous cruise control (ACC) system, an anti lock brake (ABS) system, or so on.

The determined provision forms and timings are classified according to conditions and stored as a database (S260).

An exemplary embodiment of a test of building a database according to the above-described process is described in detail as follows. For example, comparisons of time points at which a driver puts on the brake and brake pressures are made between a case of expressing an obstacle with red letters on an AR-HUD and a case of expressing the obstacle to be surrounded by green quadrangles on the AR-HUD.

If the driver has more rapidly avoided collision with the obstacle by putting on the brake more quickly and hardly when the obstacle is displayed to be surrounded by green quadrangles on the AR-HUD, it is determined that the latter provision form (green quadrangles) has higher recognition easiness than the former provision form (red letters).

Since the test result indicates that the latter provision form is a more proper form for providing safe driving information, a database is built according to the test result.

For the convenience of description and advancement of understanding, Table 1 shows a schematic example of a database of information provision forms and provision timings storing provision forms and provision timings according to groups, that is, weather and illumination.

With reference to Table 1, a method for the determination module 520 to determine provision forms and provision timings of safe driving information according to situations will be described below.

TABLE 1

| | Group | |
|---|---|---|
| | Weather | Illumination |
| Condition | Clear | Daytime |
| Form | ■ | ■ |
| Timing | 1 | 1 |
| Condition | Bad | Nighttime |
| Form | ▲ | ● |
| Timing | 2 | 2 |

The determination module 520 compares information obtained from the information collecting module 510 with driving environment information and driving situation information extracted in real time from a database generated by classifying provision forms and provision timings according to groups in the database unit 540, determining the provision form and the provision timing of safe driving information.

Specifically, the provision form and the provision timing of safe driving information are determined through three evaluations, that is, a simple comparison and evaluation of provision forms and provision timings between comparison groups, a simple comparison and evaluation of safety weights between comparison groups, and a detailed comparison and evaluation of safety weights between comparison groups.

In the simple comparison and evaluation of provision forms and provision timings between comparison groups, provision forms and provision timings in accordance with conditions of the comparison groups are simply compared to make a determination.

Specifically, when the simple comparison and evaluation of provision forms and provision timings between comparison groups indicates that the initial values of provision forms and provision timings between comparison groups, which are targets of the determination based on a previously built database, are identical (when the groups have the same provision form and provision timing), the determination module 520 determines the identical provision form and provision timing as the provision form and the provision timing of safe driving information.

For example, when information on an obstacle ahead is provided to a driver during daytime in clear weather, as shown in Table 1, a provision form and a provision timing for the condition (clear) of the group "weather" and those for the condition (daytime) of the group "illumination" are identical. Safe driving information of the obstacle ahead is provided according to the provision form and timing common to the two groups, that is, in the form "■" at the timing "1."

When the provision forms and the provision timings of groups, which are targets of the determination, are different, it is determined that the safety weights of comparison groups are different, and thus the provision form and timing of safe driving information are determined through a comparison and evaluation of the safety weights between the comparison groups.

When the initial values of provision forms and provision timings of comparison groups are different in the previously built database, the determination module 520 evaluate group-specific safety weights based on group-specific conditions (attributes of driving environment information or driving situation information obtained according to the groups). Subsequently, the simple comparison and evaluation of safety weights between comparison groups or the detailed comparison and evaluation of safety weights between comparison groups is performed according to the evaluated safety weights, and the provision form and the provision timing of safe driving information are determined.

Here, the safety weights in accordance with the group-specific conditions can be defined in advance, and according to attributes of the obtained driving environment information or driving situation information, the determination module 520 evaluates the safety weight of a group to which the driving environment information or the driving situation information belongs.

In the simple comparison and evaluation of safety weights between comparison groups, when the safety weights of the comparison groups are different, the provision form and the provision timing of safe driving information are determined by comparing the safety weights of the comparison groups with each other. For example, a group more closely related to safety between comparison groups in a previously built database is determined to have a higher safety weight. Also, the provision form and timing of the group having the higher safety weight are determined as the provision form and the provision timing of safe driving information.

For example, when information on an obstacle ahead is provided to a driver during nighttime in clear weather, a weight for the illumination group is determined to be higher than a weight for the weather group because the condition (nighttime) of the illumination group exerts a stronger influence on safety than the condition (clear) of the weather group. Therefore, according to the provision form and the provision timing for the condition (nighttime) of the illumination group, safe driving information of the obstacle ahead is provided to the driver in the form ● at the timing "2."

In a detailed comparison and evaluation of safety weights between comparison groups, when the safety weights of the comparison groups are similar or identical to each other, a provision form and timing are updated with a new provision form and timing through weight enhancement between the comparison groups. For example, when information on an obstacle ahead is provided to a driver during nighttime in bad weather, the condition "bad weather" of the weather group and the condition "nighttime" of the illumination group exert similar or identical influences on safety.

In this case, the determination module 520 combines the provision forms and timings of the two groups, and determines information on the obstacle ahead to be provided according to the form "▲ (▲+●)" and the timing "2+∝" obtained by combining the provision forms and timings of the weather and illumination groups based on content stored in a database exemplified by Table 1.

Here, the timing "2+∝" is a time point preceding a time point at which safe driving information is provided in bad weather or a time point at which safe driving information is provided in nighttime.

The information providing module 530 processes information determined by the determination module 520 in a graphic form, and displays the graphic through the AR-HUD 600 according to the driver's line of sight.

In addition, safe driving information can be generated in the form of voice and output through a speaker, etc., or generated in the form of vibration and output through a steering device, etc.

Figure 3:
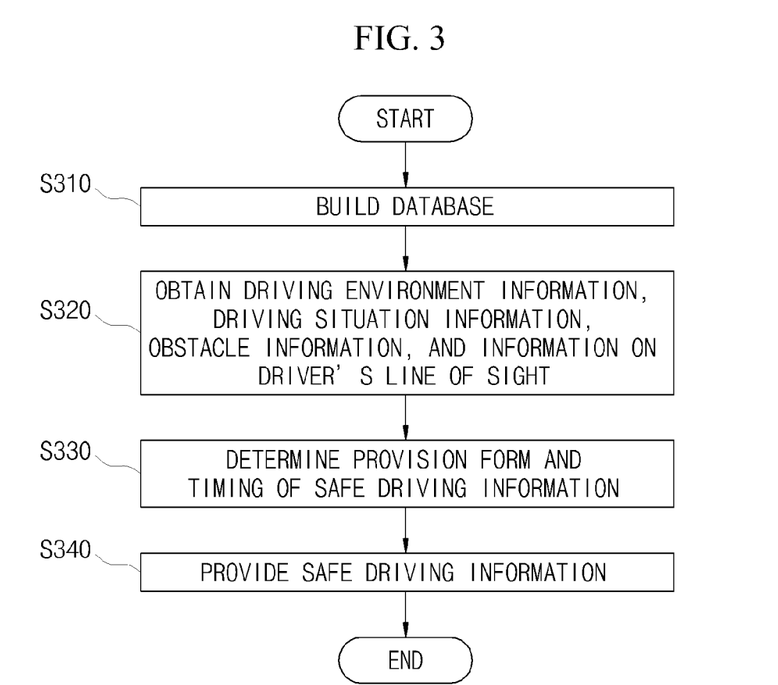
FIG. 3 is a flowchart of an overall method of providing safe driving information according to an exemplary embodiment of the present invention.

FIG. 3 is a flowchart of an overall method of providing safe driving information according to an exemplary embodiment of the present invention in which the provision form and the provision timing of safe driving information are determined.

First, a process of building a database is performed (S310).

Since the database building step (S310) has been described above, the description thereof will not be reiterated.

In an information collecting step (S320), a process of collecting driving environment information including weather information and illumination information, driving situation information including vehicle control information and road attribute information, obstacle information including a vehicle ahead and a pedestrian, and information on a driver's line of sight is performed.

Specifically, in the information collecting step (S320), the information collecting module 510 performs a process of collecting the driving environment information, the driving situation information, the obstacle information, and the information on the driver's line of sight from the aforementioned devices and processing the collected information.

In step 330, the determination module 520 performs a process of determining the provision form and the provision timing of safe driving information based on the database built in step 310 and the driving environment information and the driving situation information collected in step 320. For example, the determination module 520 compares the driving environment information and the driving situation information with the previously built database. The comparison step includes a step of simple comparison and evaluation of provision forms and provision timings between comparison groups for comparing the initial values of safe driving information provision forms and timings (i.e., values stored in the database) in accordance with group-specific conditions, and a step of simple comparison and evaluation of safety weights between comparison groups and a step of detailed comparison and evaluation of safety weights between comparison groups for determining a safe driving information provision form and timing according to a comparison result.

When the initial values of safe driving information provision forms and timings are identical between groups, the initial values are determined as the provision form and the provision timing through the simple comparison and evaluation between comparison groups.

On the other hand, when the initial values of safe driving information provision forms and timings are different between groups, the provision form and the provision timing of safe driving information are determined through the simple comparison and evaluation of safety weights between comparison groups for evaluating group-specific safety weights based on group-specific conditions (attributes of driving environment information or driving situation information obtained according to the groups).

Figure 4:
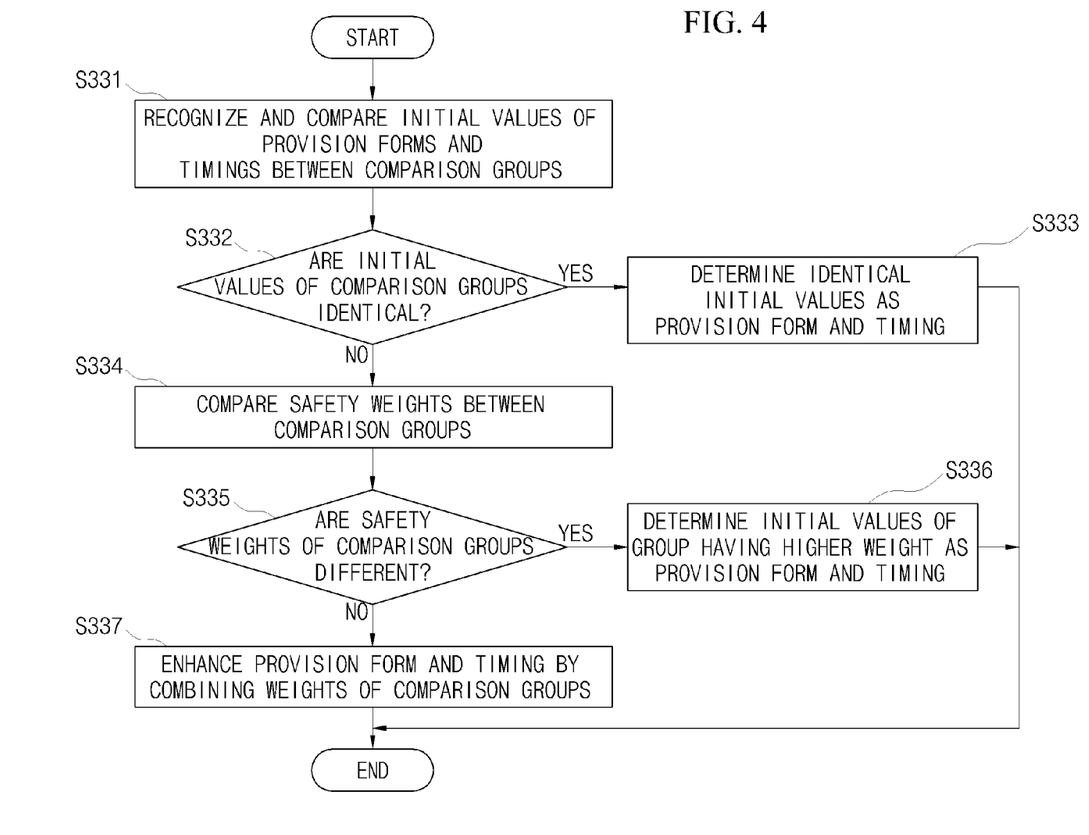
FIG. 4 is a detailed flowchart of a step of determining the provision form and the provision timing of safe driving information in a method of providing safe driving information according to an exemplary embodiment of the present invention.

With reference to FIG. 4, a process in which the determination module 520 determines the provision form and the provision timing of safe driving information will be described in further detail below.

FIG. 4 is a detailed flowchart of a step of determining the provision form and the provision timing of safe driving information of a driving-related group according to an exemplary embodiment of the present invention.

First, based on a previously built database, the determination module 520 recognizes the initial values (values stored in the database) of provision forms and timings of comparison groups according to driving environment information and driving situation information, and compares the recognized initial values of the provision forms and timings through the simple comparison and evaluation of provision forms and provision timings between comparison groups (S331).

Subsequently, it is determined whether the compared initial values of the groups are identical (S332).

When the initial values of the groups are identical, the determination module 520 determines that the groups have the same safety weight, and determines the initial values as the provision form and timing of safe driving information (S333).

On the other hand, when it is determined in step 332 that the initial values of the group-specific safe driving information provision forms and timings are different, the process proceeds to step 334, and the determination module 520 performs the simple comparison and evaluation of safety weights between comparison groups. The determination module 520 compares and evaluates group-specific safety weights based on group-specific conditions (attributes of driving environment information or driving situation information obtained according to the groups).

It is determined whether the safety weights of the comparison groups are different (S335). When the safety weights of the comparison groups are different, the process proceeds to step 336, and the determination module 520 performs the detailed comparison and evaluation of safety weights between comparison groups. Through the detailed comparison and evaluation, the determination module 520 determines initial values of a group having a higher safety weight as the provision form and the provision timing of safe driving information.

For example, when information on an obstacle ahead is provided to a driver during nighttime in clear weather, as shown in Table 1, a weight for the illumination group is higher than a weight for the weather group in the clear night because the condition "nighttime" of the illumination group exerts a stronger influence on safety than the condition "clear" of the weather group.

Therefore, according to initial values of the condition "nighttime" of the illumination group based on the built database of Table 1, information on an obstacle ahead is provided in the form "●" at the timing "2."

On the other hand, when a result of the simple comparison and evaluation indicates that the group-specific safety weights in accordance with the conditions are identical, the process proceeds to step 337, and the determination module 520 performs a process of upgrading the provision form and timing of safe driving information according to a combination of the weights of the comparison groups.

For example, when information on an obstacle ahead is provided to a driver during nighttime in bad weather, the condition "bad weather" of the weather group and the condition "nighttime" of the illumination group exert similar or identical influences on safety.

In this case, the determination module 520 can combine the provision forms and timings of the two groups, and strictly determine information on the obstacle ahead to be provided according to the form "▲ (▲+●)" and the timing "2+∝" obtained by combining the provision forms and timings of the weather and illumination groups based on content stored in a database exemplified by Table 1. For example, when a vehicle travels during nighttime in bad weather, the determination module 520 provides safe driving information at a timing preceding a timing at which safe driving information is provided in bad weather.

Safe driving information provided to a driver includes physical information (e.g., a vehicle speed) of a vehicle, warning information of collision accidents, obstacle information, driving behavior information, warnings for the driver's safety, caution information, and anti-collision warnings.

According to the above-described exemplary embodiments of the present invention, safe driving information adapted for a driving environment and a driving situation is provided such that a driver can rapidly and efficiently recognize the safe driving information in various driving environments and driving situations that may occur during a travel.

In addition, a modeling technology obtained by analyzing information on drivers' lines of sight, changes in physical data of vehicles, and driving environment data can be ensured, and thus it is possible to lead domestic and foreign standardization.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An apparatus for providing safe driving information, the apparatus comprising:
   an information collecting module including circuitry configured to collect driving environment information and driving situation information of a vehicle, obstacle information, and information on a driver's line of sight from sensors, and process the collected information;
   a database unit configured to store provision forms and provision timings of previously set safe driving information according to groups formed by grouping driving environment information and driving situation information by attribute and driving environment conditions and driving situation conditions in the groups;
   a determination module including circuitry configured to determine a provision form and a provision timing of safe driving information during a travel based on the driving environment information, the driving situation information, the obstacle information, and the information on the driver's line of sight obtained from the information collecting module and the provision forms and the provision timings stored in the database unit; and
   an information providing module including circuitry configured to control a display unit to provide the safe driving information according to the determined provision form and timing of the safe driving information;
   wherein the database unit stores a provision form and a provision timing of safe driving information determined through a test according to the conditions in the group information based on analysis results of recognition easiness, information understanding, information concentration, and safe driving performance of the driver.

2. The apparatus of claim 1, wherein the information collecting module collects the driving environment information and the driving situation information of the vehicle, the obstacle information, and the information on the driver's line of sight from an environment recognition device including at least one of a temperature sensor, a rain sensor, and an illumination sensor, a surrounding situation recognition device including at least one of a speed sensor, a steering angle sensor, a brake pressure sensor, a diagnosis sensor, and a navigation sensor, an obstacle recognition device including at least one of a radar, an infrared sensor, an ultrasonic sensor, and a vision sensor, and a device for recognizing a driver's line of sight including at least one of an eye tracker and a vision sensor.

3. The apparatus of claim 1, wherein the database unit stores the driving environment information, group information obtained by grouping the driving environment information according to attributes of the driving environment information, and provision forms and provision timings of safe driving information according to the conditions in the group information.

4. The apparatus of claim 1, wherein the determination module determines the provision form and the provision timing of the safe driving information through at least one of a simple comparison and evaluation of provision forms and provision timings between comparison groups, a simple comparison and evaluation of safety weights between comparison groups, and a detailed comparison and evaluation of safety weights between comparison groups based on the driving environment information, the driving situation information, and the provision forms and the provision timings stored in the database unit according to the conditions in the groups.

5. The apparatus of claim 4, wherein, when provision forms and provision timings according to conditions of groups are identical, the determination module determines the identical provision form and timing as the provision form and the provision timing of the safe driving information.

6. The apparatus of claim 4, wherein, when provision forms and provision timings according to conditions of groups are different, the determination module determines the provision form and the provision timing of the safe driving information according to a result of the simple comparison and evaluation of safety weights between comparison groups.

7. The apparatus of claim 6, wherein, when the result of the simple comparison and evaluation of safety weights between comparison groups indicates that weights for the conditions of the groups are identical, the determination module determines an enhanced provision form and provision timing of the safe driving information by combining provision forms and provision timings for the conditions of the evaluation-target groups through the detailed comparison and evaluation of safety weights between comparison groups.

8. A method of providing safe driving information, the method comprising:
building a database including group information obtained by grouping driving environment information and driving situation information according to attributes of the driving environment information and the driving situation information, and provision forms and provision timings of safe driving information determined according to conditions in groups;
collecting driving environment information, driving situation information, obstacle information, and information on a driver's line of sight in real time;
determining a provision form and a provision timing of safe driving information based on the collected information and the database; and
providing the safe driving information according to the determined provision form and timing;
wherein the determining of the provision form and the provision timing includes determining the provision form and the provision timing through at least one test according to the conditions in the groups based on analysis results of recognition easiness, information understanding, information concentration, and safe driving performance of the driver.

9. The method of claim 8, wherein the building of the database includes:
setting criteria for grouping the driving environment information, the driving situation information and the obstacle information;
setting tasks to be performed in the at least one test;
setting test environments for determining group-specific optimal provision forms and timings;
conducting the at least one test; and
analyzing a result of the at least one test.

10. The method of claim 8, wherein the determining of the provision form and the provision timing of the safe driving information includes:
comparing initial values of group-specific provision forms and provision timings based on at least one of the driving environment information and the driving situation information and the provision forms and the provision timings of safe driving information stored in the database; and
determining the initial values as the provision form and the provision timing of the safe driving information when the compared initial values are identical.

11. The method of claim 10, wherein the determining of the provision form and the provision timing of the safe driving information further includes, when the compared initial values are different, determining group-specific safety weights, and determining initial values of a group having a higher safety weight according to a determination result as the provision form and the provision timing of the safe driving information.

12. The method of claim 11, wherein the determining of the provision form and the provision timing of the safe driving information further includes, when the determined group-specific safety weights are identical, determining the provision form and the provision timing of the safe driving information through weight enhancement between comparison groups.

13. The method of claim 8, wherein the providing of the safe driving information includes matching an augmented reality head-up display (AR-HUD) in a vehicle to the driver's line of sight based on the information on the driver's line of sight, and providing the safe driving information.

* * * * *

UNITED STATES PATENT AND TRADEMARK OFFICE
CERTIFICATE OF CORRECTION

PATENT NO. : 9,576,489 B2  
APPLICATION NO. : 14/598733  
DATED : February 21, 2017  
INVENTOR(S) : Hye Sun Park et al.

It is certified that error appears in the above-identified patent and that said Letters Patent is hereby corrected as shown below:

On the Title Page

Item (71) (Applicant):
"ETRI-JIM-ELECTRONICS AND TELECOMMUNICATIONS RESEARCH INSTITUTE" should be changed to --ELECTRONICS AND TELECOMMUNICATIONS RESEARCH INSTITUTE--

Signed and Sealed this
Twenty-third Day of May, 2017

Michelle K. Lee
*Director of the United States Patent and Trademark Office*